United States Patent [19]

Diccianni et al.

[11] Patent Number: 5,441,708

[45] Date of Patent: Aug. 15, 1995

[54] COVED CORNER FACILITY FOR PROVIDING A SEALED WORK AREA TO HANDLE, MANIPULATE AND FORMULATE MATERIALS

[76] Inventors: Anthony M. Diccianni, 330 Knoll Rd., Norristown, Pa. 19401; Eric A. Diccianni, 209 Lincoln Woods, Lafayette Hill, Pa. 19444

[21] Appl. No.: 192,466

[22] Filed: Feb. 7, 1994

[51] Int. Cl.$^6$ .................. A61L 2/00; E04B 1/343
[52] U.S. Cl. .................. 422/292; 52/280; 312/1; 454/57; 454/187
[58] Field of Search .............. 52/280; 312/1, 114, 312/140; 454/56–58, 63, 187; 422/292, 120

[56] References Cited

U.S. PATENT DOCUMENTS

| | | | |
|---|---|---|---|
| 333,371 | 12/1885 | Wilson et al. | 228/142 |
| 2,163,209 | 6/1939 | Püngel | 189/37 |
| 2,219,595 | 10/1940 | Lang | 29/148 |
| 3,357,092 | 12/1967 | Nelson | 29/476 |
| 3,750,558 | 8/1973 | Jokiel et al. | 89/40 D |
| 3,831,675 | 8/1974 | McLain | 165/177 |
| 3,938,233 | 2/1976 | Cannon | 29/157.3 R |
| 4,108,509 | 8/1978 | Piet et al. | 312/1 |
| 4,167,233 | 9/1979 | Hare | 220/72 |
| 4,261,667 | 4/1981 | Ervin et al. | 403/258 |
| 4,380,110 | 4/1983 | Harig | 29/525 |
| 4,566,293 | 1/1986 | Arner et al. | 62/514 R |
| 4,804,392 | 2/1989 | Spengler | 55/356 |
| 4,891,923 | 1/1990 | Ericsson et al. | 52/280 |
| 5,010,777 | 4/1991 | Yehl et al. | 73/864.81 |
| 5,085,134 | 2/1992 | Hofstra et al. | 454/67 |
| 5,256,105 | 10/1993 | Austin | 454/187 |
| 5,257,957 | 11/1993 | Diccianni et al. | 454/57 |
| 5,259,812 | 11/1993 | Kleinsek | 454/59 |
| 5,316,560 | 5/1994 | Krone-Schmidt et al. | 422/124 X |

FOREIGN PATENT DOCUMENTS 808506  2/1959  United Kingdom .............. 52/280

*Primary Examiner*—Robert J. Warden
*Assistant Examiner*—E. Leigh Dawson
*Attorney, Agent, or Firm*—Panitch Schwarze Jacobs & Nadel

[57] ABSTRACT

A coved corner facility for providing a sealed work area to handle, manipulate and formulate materials which includes a walled enclosure having a plurality of mutually adjoining generally planar walls which define a work area. The planar portions of at least a plurality of mutually adjoining pairs of the walls intersect at angles of less than about 135°. Each of the plurality of adjoining pairs of the walls are connected by preformed generally arcuate transition areas extending continuously between the planar portions of the adjoining pairs of walls. An inlet port in the walled enclosure is provided for allowing air to flow into the work area. An outlet port is provided in the walled enclosure for allowing air to flow out of the work area. An air flow control device causes air to flow through the inlet port into the work area and out of the enclosure work area through the outlet port.

16 Claims, 2 Drawing Sheets

COVED CORNER FACILITY FOR PROVIDING A SEALED WORK AREA TO HANDLE, MANIPULATE AND FORMULATE MATERIALS

FIELD OF THE INVENTION

The present invention relates to a facility for providing a sealed work area to handle, manipulate and formulate materials and, more particularly, to a coved corner facility for facilitating the cleanup and decontamination of the work area within the facility.

BACKGROUND OF THE INVENTION

In the handling, manipulating and formulating of potent compounds and hazardous or toxic materials, it is known to employ a glove box or other type of sealed enclosure, such as an isolation system, to prevent the operator from being exposed to the materials. The operator performs various tasks through glove ports to thereby biologically remove the operator form the hazardous or toxic environment within the sealed enclosure. In relatively large sealed enclosures, the operator uses a protective upper torso suit.

While the foregoing provides adequate protection for the operator, the problem of cleanup of the work area within the enclosure remains a hazardous, laborious and extremely time-consuming and expensive task. Moreover, although precautions are taken in the cleanup procedures, the possibility exists that complete cleanup is not accomplished. That is, conventional cleanup and decontamination procedures involve the application of a solution, such as bleach, peracetic acid, or hydrogen peroxide, to the interior surfaces of the unit. However, the application of such solutions to the interior surfaces of the unit can be problematic if the walls of the unit intersect at angles of less than about 135° to form sharp or acutely angled corners wherein the solution can lie and harbor microbial growth after the cleanup procedure is completed. This may create significant down time because the user may have to wait a significant period of time for the interior of the unit to dry. Further, if the unit is being used to handle sterile materials, there is the risk that the sterility of the unit may be jeopardized due to cleaning solution remaining in the corners of the unit. Similarly, if the unit is being used to handle potent compounds or hazardous materials, traces of the potent compound or hazardous material may remain in the corners of the unit after the cleaning solution evaporates.

Attempts to solve the problem have involved the creation of isolation systems which include coved corners. However, such conventional isolation systems have not proved to be cost effective. For instance, one known isolation system utilizes a frame which is constructed of tubing having a generally square cross section. The walls of the system are formed by generally planar panels which extend between the generally square tubular frame members. With this construction, a sharp corner is formed where each panel is attached to a tubular frame member. To create a coved corner, a longitudinally extending insert which is generally arcuate in cross section is secured within the corners formed between the panels and the tubular frame members. That is, in the case where the tubular frame member extends generally vertical and a pair of panels extend at right angles with respect to each other from the tubular frame member, a first insert is placed between one panel and the tubular frame member and a second insert is placed between the second panel and the tubular member. The application of the insert to the tubular frame member and panel is labor intensive, especially in the area where three tubular members and panels meet to form a corner of the isolation system. The cost of assembling this system has proved to be prohibitive because of the complex structure of the corners.

The present invention overcomes many of the disadvantages inherent in the above-described sealed enclosures or isolation systems, by providing a walled enclosure wherein adjoining walls are connected by preformed generally arcuate transition areas extending continuously between the planar portions of the adjoining walls. In this manner, the enclosure is easily and inexpensively assembled and can be cleaned and decontaminated without fear of the cleaning solution remaining in the corners of the system and without fear of microbial growth harboring in the corners of the system. Thus, the present invention comprises a facility which can be readily decontaminated and sterilized in a relatively short amount of time while assisting in preventing traces of hazardous materials from remaining in the corners of the unit. Use of the present invention results in a cost effective and safer decontamination and sterilization facility for handling, manipulating and formulating materials in a sealed work area.

SUMMARY OF THE INVENTION

Briefly stated, the present invention comprises a coved corner facility for providing a sealed work area to handle, manipulate and formulate materials. The facility includes a walled enclosure having a plurality of mutually adjoining generally planar walls each including an interior surface defining a work area. Planar portions of at least a plurality of mutually adjoining pairs of the walls intersect at angles of less than about 135°. Each of the plurality of adjoining pairs of the walls are connected by preformed generally arcuate transition areas extending continuously between the planar portions of the adjoining pairs of walls. An inlet port in the walled enclosure allows air to flow into the work area. An outlet port in the walled enclosure allows air to flow out of the work area. An air flow control device causes air to flow through the inlet port into the work area and out of the enclosure work area through the outlet port.

BRIEF DESCRIPTION OF THE DRAWINGS

The foregoing summary, as well as the following detailed description of the preferred embodiment, will be better understood when read in conjunction with the appended drawings. For the purpose of illustrating the invention, there is shown in the drawings an embodiment which is presently preferred. It being understood, however, that the invention is not limited to the specific methods and instrumentalities disclosed. In the drawings.

DETAILED DESCRIPTION OF PREFERRED EMBODIMENT

Figure 1:
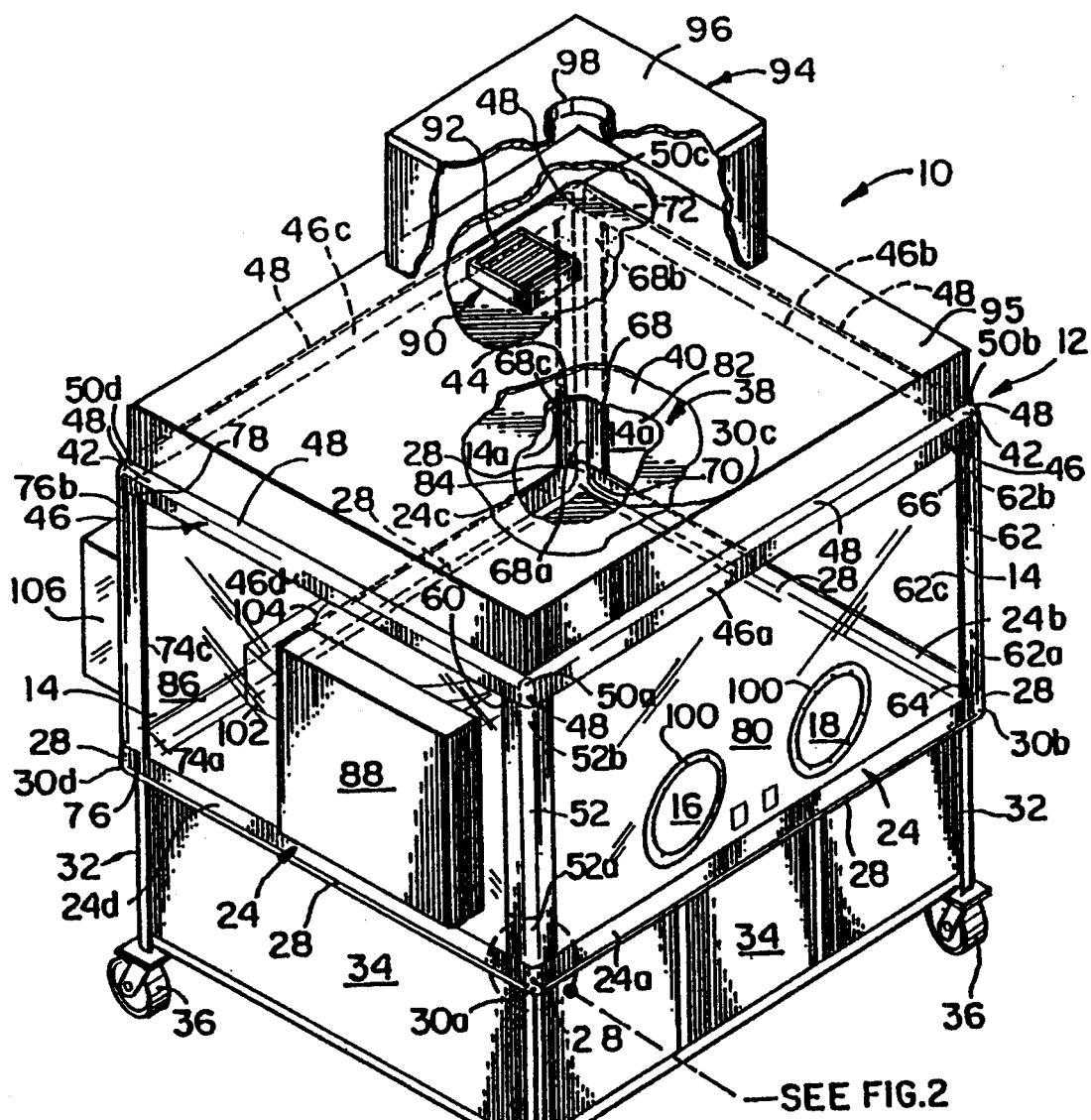
FIG. 1 is a perspective view, partially broken away, of a facility in accordance with the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the facility and designated parts thereof. The terminology includes the words above specifically mentioned, derivatives thereof and words of similar import.

Referring to the drawings, wherein like numerals indicate like elements throughout, there is shown in FIG. 1 a perspective view of a coved corner facility, generally designated 10, for providing a sealed work area to handle, manipulate and formulate materials (not shown). The facility 10 comprises a walled enclosure 12 including a plurality of mutually adjoining generally planar walls 14 each having an interior surface 14a defining a work area 16.

Figure 4:
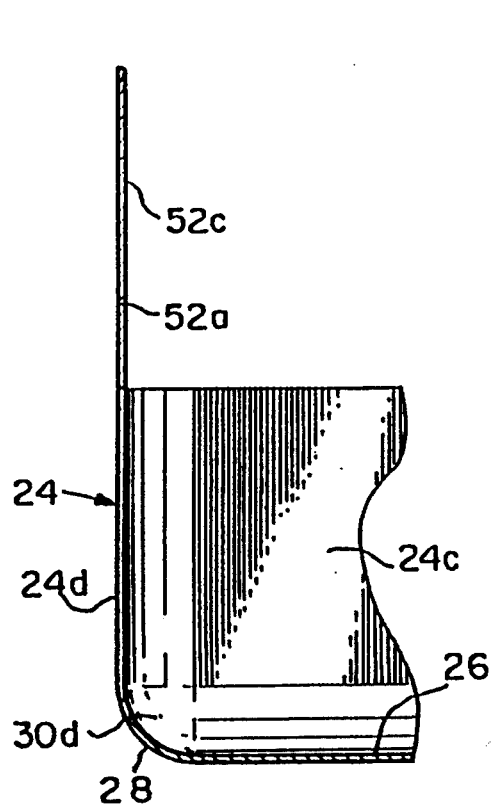
FIG. 4 is a greatly enlarged cross-sectional view of the corner shown in FIG. 2 taken along lines 4—4 of FIG. 2.
Figure 5:
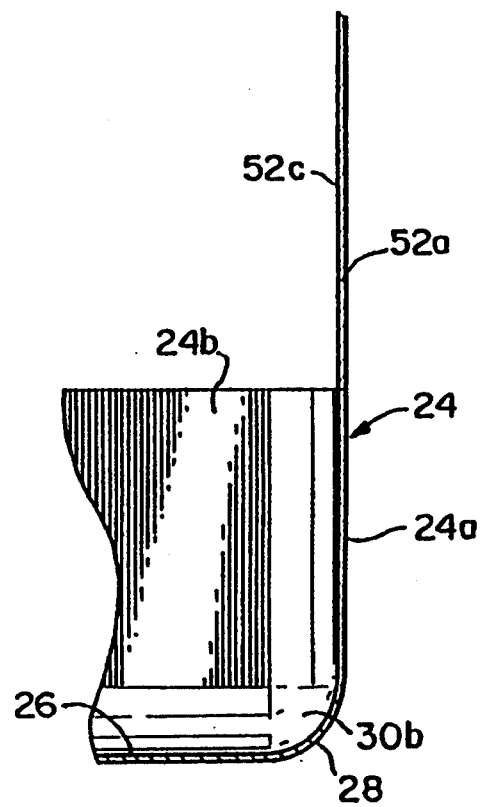
FIG. 5 is a greatly enlarged cross-sectional view of the corner shown in FIG. 2 taken along lines 5—5 of FIG. 2.

More particularly, the walled enclosure 12 is formed of a first pan 18 including a first wall 20 having a periphery 22 and a first circumferential flange 24 extending generally perpendicularly from the periphery 22 of the first wall 20. The first pan 18 includes an interior surface 26 for assisting in defining the work area 16. As best shown in FIGS. 4 and 5, a preformed generally arcuate transition area 28 extends continuously between the periphery 22 of the first wall 20 and the first circumferential flange 24.

In the present embodiment, it is preferred that the periphery 22 of the first wall 20 define first, second, third and fourth corners 30a, 30b, 30c, 30d, respectively. It is also preferred that the first circumferential flange 24 of the first pan 18 be divided into a first flange portion 24a extending generally perpendicularly from the periphery 22 between the first and second corners 30a, 30b, a second flange portion 24b extending generally perpendicularly from the periphery 22 between the second and third corners 30b, 30c, a third flange portion 24c extending generally perpendicularly from the periphery 22 between the third and fourth corners 30c, 30d, and a fourth flange portion 24d extending generally perpendicularly from the periphery 22 between the fourth and first corners 30d, 30a, respectively. Thus, it is preferred that the preformed generally arcuate transition areas 28 extend continuously between the periphery 22 and the first, second, third and fourth flange portions 24a, 24b, 24c, 24d, the first and second flange portions 24a, 24b, the second and third flange portions 24b, 24c, the third and fourth flange portions 24c, 24d, and the fourth and first flange portions 24d, 24a.

Figure 3:
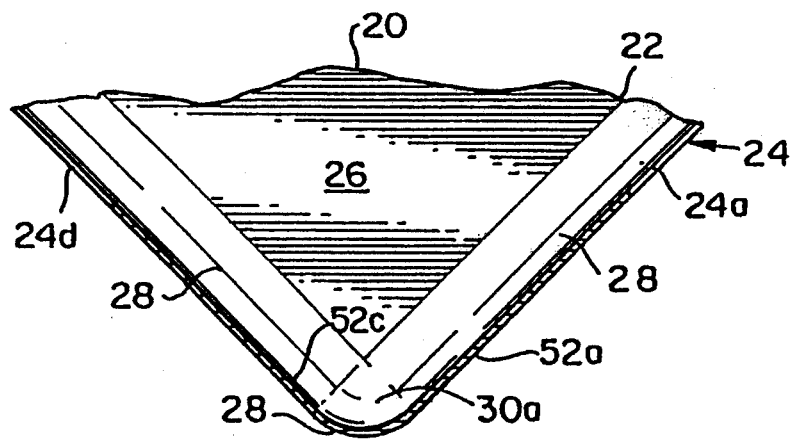
FIG. 3 is a greatly enlarged cross-sectional view of the corner shown in FIG. 2 taken along lines 3—3 of FIG. 2.

As best shown in FIGS. 3, 4 and 5, each arcuate transition area 28 has a curvature sufficiently open to maintain a uniform velocity of a fluid or cleaning solution (not shown), such as bleach, peracetic acid or hydrogen peroxide, through the transition area 28 during cleanup and decontamination procedures and to prevent the entrapment of the cleaning solution in the transition area 28. In the present embodiment, it is preferred that each transition area 28 have a radius of curvature of ¾ of an inch. However, it is understood by those skilled in the art that other radii of curvatures could be used, so long as the radius curvature is at least 1/32 of an inch. Unless otherwise stated herein, the transition areas described hereinafter each have a radius of curvature which is similar to that of the radius of curvature of the transition areas 28 of the first pan 18.

In the present embodiment, it is preferred that the first pan 18 be constructed of a high strength, lightweight material, such as stainless steel, for providing the first pan 18 with structural integrity. However, it is understood by those skilled in the art from this disclosure that the first pan 18 could be constructed of other materials, such as aluminum, brass or a suitable polymeric material, without departing from the spirit and scope of the invention. It is preferred that the first pan 18 be constructed of a welding process wherein each of the welds is ground and polished to a smooth finish. It is also understood by those skilled in the art from this disclosure that other methods could be used to construct the first pan 18. For instance, if the first pan 18 were constructed of a polymeric material, a molding process could be used.

Referring now to FIG. 1, extending downwardly from each corner 30a, 30b, 30c, 30d, of the first pan 18 is a tubular member 32 for providing a frame to support the first pan 18 of the walled enclosure 12 above a support surface (not shown). Each tubular member 32 is preferably constructed of generally square stainless steel tubing for strongly supporting the walled enclosure 12. However, it is understood by those skilled in the art that the tubular members 32 can be formed in any configuration, or constructed of other materials, such as generally rectangular aluminum tubing, without departing from the spirit and scope of the invention.

A series of lower courtesy panels 34 extend downwardly from the periphery 22 of the first pan 18 between the tubular members 32 to provide the walled enclosure 12 with an overall aesthetically pleasing appearance and to mount the control elements (not shown) of the facility 10. Positioned at the bottom of each of the tubular members 32 is a wheel 36 for providing the enclosure 12 with a degree of portability. Although it is preferred that the facility 10 include the lower courtesy panels 34, the lower courtesy panels 34 are not pertinent to the present invention and could be omitted without affecting the operation of the facility 10.

Referring now to FIG. 1, there is shown a second pan 38 spaced from the first pan 18 and including a second wall 40 having a periphery 42. The second pan 38 is preferably spaced from the first pan 18 a distance sufficient to form the work area 16. The second pan 38 includes an interior surface 44 to assist in defining the work area 16. The second wall 40 includes a second circumferential flange, generally designated 46, extending generally perpendicularly from the periphery 42 of the second wall 40. A preformed generally arcuate transition area 48 extends continuously between the periphery 42 of the second wall 40 and the second circumferential flange 46.

The periphery 42 of the second wall 40 defines fifth, sixth, seventh and eighth corners 50a, 50b, 50c, 50d, respectively. It is preferred that the second circumferential flange 46 of the second pan 38 be divided into a fifth flange portion 46a extending generally perpendicularly from the periphery 42 of the second wall 40 between the fifth and sixth corners 50a, 50b, a sixth flange portion 46b extending generally perpendicularly from the periphery 42 of the second wall 40 between the sixth and seventh corners 50b, 50c, a seventh flange portion 46c extending generally perpendicularly from the periphery 42 of the second wall 40 between the seventh and eighth corners 50c, 50d, and an eighth flange portion 46d extending generally perpendicularly from the periphery 42 of the second wall 40 between the eighth and fifth corners 50d, 50a, respectively. The second pan 38 includes preformed generally arcuate transition areas 48 extending continuously between the periphery 42 of the second wall 40 and the fifth, sixth, seventh and eighth flange portions 46a, 46b, 46c, 46d, the fifth and sixth flange portions 46a, 46b, the sixth and seventh flange portions 46b, 46c, said seventh and eighth flange portions 46c, 46d, and the eighth and fifth flange portions 46d, 46a, respectively.

Figure 2:
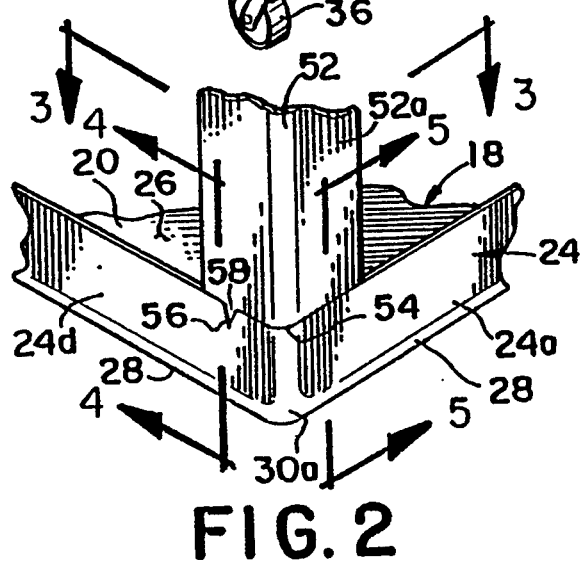
FIG. 2 is an enlarged fragmentary view of a corner of the facility of FIG. 1.

Referring now to FIGS. 1 and 2, the walled enclosure 12 includes a first strut 52 extending between the first and second circumferential flanges 24, 46 at the first and fifth corners 30a, 50a. More particularly, the first strut 52 extends between the transition area 28 between the first and fourth flange portions 24a, 24d and the transition area 48 between the fifth and eighth flange portions 46a, 46d. The first strut 52, as best shown in FIG. 3, is generally arcuate in cross section such that the first strut 52 complements the transition area 28 between the first and fourth flange portions 24a, 24d and the transition area 48 between the fifth and eighth flange portions 46a, 46d. The first strut 52 includes a first end 52a, a second end 52b and an interior surface 52c.

A first joint 54 is formed between the first end 52a of the first strut 52 and the transition area 28 between the first and fourth flange portions 24a, 24d such that the interior surface 52c of the first strut 52 and the interior surface 26 of the first pan 18 are generally co-planar proximate the first joint 54. In the present embodiment, it is preferred that the first joint 54 be formed by butt welding the first end 52a of the first strut 52 to the transition area 28 between the first and fourth flange portions 24a, 24d. A notch 56 is formed in the fourth flange portion 24d for complementarily receiving a finger 58 extending from the first end 52a of the first strut 52 to interlock the first strut 52 and first pan 18 during the welding process. Similarly, a second joint 60 is formed by butt welding the second end 52b of the first strut 52 to the transition area 48 between the fifth and eighth flange portions 46a, 46d in the same manner that the first joint 54 is formed.

A second strut 62 extends between the first and second circumferential flanges 24, 46 at the second and sixth corners 30b, 50b. More particularly, the second strut 62 extends between the transition area 28 between the first and second flange portions 24a, 24b and the transition area 48 between the fifth and sixth flange portions 46a, 46b. The second strut 62 is generally arcuate in cross section such that the second strut 62 complements the transition area 28 between the first and second flange portions 24a, 24b and the transition area 48 between the fifth and sixth flange portions 46a, 46b. The second strut 62 includes a first end 62a, a second end 62b and an interior surface 62c. A third joint 64 is formed between the first end 62a of the second strut 62 and the transition area 28 between the first and second flange portions 24a, 24b such that the interior surface 62c of the second strut 62 and the interior surface 26 of the first pan 18 are generally co-planar proximate the third joint 64. Similarly, a fourth joint 66 is formed between the second end 62b of the second strut 62 and the transition area 48 between the fifth and sixth flange portions 46a, 46b such that the interior surface 62c of the second strut 62 and the interior surface 44 of the second pan 38 are generally co-planar proximate the fourth joint 64. The third and fourth joints 64, 66 are preferably formed in the same manner as the first and second joints 54, 60.

As shown in FIG. 1, a third strut 68 extends between the first and second circumferential flanges 24, 46 at the third and seventh corners 30c, 50c. More particularly, the third strut 68 extends between the transition area 28 between the second and third flange portions 24b, 24c and the transition area 48 between the sixth and seventh flange portions 46b, 46c. The third strut 68 is generally arcuate in cross section such that the third strut 68 complements the transition area 28 between the second and third flange portions 24b, 24c and the transition area 48 between the sixth and seventh flange portions 46b, 46c. The third strut 68 includes a first end 68a, a second end 68b and an interior surface 68c. A fifth joint 70 is formed between the first end 68a of the third strut 68 and the transition area 28 between the second and third flange portions 24b, 24c such that the interior surface 68c of the third strut 68 and the interior surface 26 of the first pan 18 are generally co-planar proximate the fifth joint 70. Similarly, a sixth joint 72 is formed between the second end 68b of the third strut 68 and the transition area 48 between the sixth and seventh flange portions 46b, 46c such that the interior surface 68c of the third strut 68 and the interior surface 44 of the third pan 38 are generally co-planar proximate the sixth joint 72. The fifth and sixth joints 70, 72 are formed in the same manner as the first and second joints 54, 60.

A fourth strut 74 extends between the first and second circumferential flanges 24, 46 at the fourth and eighth corners 30d, 50d. More particularly, the fourth strut 74 extends between the transition area 28 between the third and fourth flange portions 24c, 24d and the transition area 48 between the seventh and eighth flange portions 46c, 46d. The fourth strut 74 is generally arcuate in cross section such that the fourth strut 74 complements the transition area 28 between the third and fourth flange portions 24c, 24d and the transition area 48 between the seventh and eighth flange portions 46c, 46d. The fourth strut 74 includes a first end 74a, a second end 74b and an interior surface 74c. A seventh joint 76 is formed between the first end 74a of the fourth strut 74 and the transition area 28 between the third and fourth flange portions 24c, 24d such that the interior surface 74c of the fourth strut 74 and the interior surface 26 of the first pan 18 are generally co-planar proximate the seventh joint 76. Similarly, an eighth joint 78 is formed between the second end 74b of the fourth strut 74 and the transition area 44 between the seventh and eighth flange portions 46c, 46d such that the interior surface 74c of the fourth strut 74 and the interior surface 44 of the second pan 38 are generally co-planar proximate the eighth joint 78.

While in the present embodiment, it is preferred that the first, second, third and fourth struts 52, 62, 68, 74 be positioned between the corners of the first and second pans 18, 38, it is understood by those skilled in the art from this disclosure that the present invention is not limited to locating the struts in any particular position between the first and second pans 18, 38. Further, it is preferred that the first, second, third and fourth struts 52, 62, 68, 74 and the second pan 38 be constructed of the same material and in the same manner as the first pan 18, as described above.

Referring now to FIG. 1, to form the walled enclosure 12, a first panel 80 extends between the first flange portion 24a of the first pan 18, the fifth flange portion 46a of the second pan 38, the first strut 52 and the second strut 62. The first panel 80 is sized to overlap the exterior surfaces of the first flange portion 24a, first strut 52, fifth flange portion 46a and second strut 62. Preferably, the first panel 80 is secured to the first strut 52, first flange portion 24a, fifth flange portion 46a and second strut 62 by standard fasteners, such as bolts (not shown), with a gasket (not shown) disposed therebetween to form a tight seal. A sealant material, such as caulk (not shown), is applied between the edges of the first flange portion 24a, first strut 52, fifth flange portion 46a and second strut 62 and the periphery of the first panel 80 to provide a smooth continuous surface between the same.

In the present embodiment, it is preferred that the first panel 80 be constructed of a transparent material, such as Lexan ®. However, it is understood by those skilled in the art that other materials, both transparent and nontransparent, such as glass Plexiglas ®, stainless steel or aluminum, could be used without departing from the spirit and scope of the invention. Similarly, the first panel 80 could be secured to the first flange portion 24a, first strut 52, fifth flange portion 46a and second strut 62 in other manners without departing from the spirit and scope of the invention. For instance, an adhesive could be used or, if the first panel 80 were constructed of stainless steel, the first panel 80 could be butt welded to the first flange portion 24a, first strut 52, fifth flange portion 46a and second strut 62.

As best shown in FIG. 1, a second panel 82 extends between the first pan 18, second pan 38, second strut 62 and third strut 68. A third panel 84 extends between the first pan 18, second pan 38, third strut 68, and fourth strut 74. A fourth panel 86 extends between the first pan 18, second pan 38, fourth strut 74 and the first strut 52. The second, third and fourth panels 82, 84, 86 are generally identical to the first panel 80 and are installed and mounted in the same manner. Accordingly, further description thereof is omitted for purposes of convenience only, and is not limiting.

As is apparent from the foregoing description, the first pan 18, second pan 38, first strut 52, second strut 62, third strut 68, fourth strut 74, first panel 80, second panel 82, third panel 84 and fourth panel 86 co-act to form the walled enclosure 12 which defines the internal work area 16. While in the present embodiment it is preferred that the walled enclosure 12 be generally in the form of a parallelepiped, it is understood by those skilled in the art from this disclosure that the walled enclosure 12 could be of other configurations, such as generally triangular in plan view and generally trapezoidal in side view so long as the walls which intersect at angles of less than 135° include preformed generally arcuate transition areas therebetween.

As is apparent from above, the planar portions of at least a plurality of the mutually adjoining pairs of walls defined by the first pan 18, second pan 38, first strut 58, second strut 62, third strut 68, fourth strut 74, first panel 80, second panel 82, third panel 84 and fourth panel 86 intersect at angles of about 90°. Each of the plurality of adjoining pairs of the walls are connected by preformed generally arcuate transition areas extending continuously between the planar portions of the adjoining pairs of walls. These preformed generally arcuate transition areas prevent cleaning solutions and other hazardous materials from being trapped within the enclosure 12 and promote the cleanability of the facility 10. While the walls of the enclosure 12 10 intersect at angles of approximately 90°, it is understood by those skilled in the art from this disclosure that it is preferred that generally arcuate transition areas be used between any walls which intersect at angles of less than about 135°.

Referring now to FIG. 1, the enclosure 12 includes an inlet port 88 (schematically shown) for allowing air to flow into the enclosure work area 16 and an outlet port 90 for allowing air to flow out of the enclosure work area 16. In the present embodiment, it is preferred that the inlet port 88 be formed in the fourth panel 86. However, it is understood by those skilled in the art from this disclosure that the inlet port 88 could be formed in any of the first, second, third or fourth panels 80, 82, 84, 86 or the first and second pans 18, 38. The outlet port 90 is preferably formed in the second wall 40 of the second pan 38, although the outlet port 90 could be formed in any of the first, second, third or fourth panels 80, 82, 84, 86 as well as the first pan 18, without departing from the spirit and scope of the invention. Thus, the location of the inlet or outlet ports 88, 90 is not pertinent to the present invention and they may be located anywhere in the enclosure 12 as long as a sufficient flow of air is available.

Both the inlet port 88 and the outlet port 90 include a high efficiency particulate air (HEPA) filter 92 (not shown on the inlet port 88) for filtering air flowing through the inlet and outlet ports 88, 90. The particular manner in which the filter 92 is secured to the inlet and outlet ports 88, 90 is not pertinent to the present invention and is well understood by those skilled in the art. An example of the use of a gel seal to secure a HEPA filter to an inlet or outlet port of an isolation system is disclosed in U.S. Pat. No. 5,257,957, which is hereby incorporated by reference. Similarly, it is understood by those skilled in the art that the present invention is not limited to any particular number of inlet or outlet ports. That is, the enclosure 12 could include two or more inlet ports and/or two or more outlet ports without departing from the spirit and scope of the invention. Moreover, it is understood by those skilled in the art that the present invention is not limited to the use of a HEPA filter in the inlet/outlet ports 88, 90. For instance, other types of filters, such as ULPAORANY efficiency air filter, could be utilized without departing from the spirit and scope of the invention.

As shown in FIG. 1, the facility 10 further includes an air flow control device 94 for causing air to flow through the inlet port 88 into the work area 16 and out of the work area 16 through the outlet port 90. In the present embodiment, the flow control device 94 is comprised of a motor driven suction blower (not shown) positioned within a housing 96 above the outlet port 90. The housing 96 preferably surrounds the outlet port 90 and is in sealed engagement with the second panel 38 to thereby provide the greatest efficiency for withdrawing air from the work area 16. The housing 96 includes an exhaust port 98 for allowing the air to escape from the housing 96. The suction blower has sufficient power to create a negative pressure within the enclosure work area 16 to prevent the accidental escape of fumes, etc. from the work area 16. The suction blower is controlled by one or more power switches (not shown) mounted on the lower courtesy panels 34. Standard circuitry (not shown) is interposed between the suction blower and the control switches, as is understood by those skilled in the art. That is, the air flow control device 94, the suction blower and control circuitry are items well understood by those skilled in the art and are disclosed in U.S. Pat. No. 5,257,957, which has been incorporated by reference above. Accordingly, further description of the air flow control device 94 is omitted for purposes of convenience only and is not limiting.

While in the present embodiment, it is preferred that the air flow control device 94 be comprised of a suction blower at the outlet port 90, it is understood by those skilled in the art from this disclosure that the present invention is not limited to negative pressure facilities. That is, a fan could be located at the inlet port 88 to thereby create a positive or equal pressure facility which does not handle toxic or other hazardous materials without departing from the spirit and scope of the invention.

Extending upwardly from the second pan 38 is an upper courtesy panel assembly 95. The upper courtesy panel assembly 95 places the instrumentation and other elements (not shown) of the walled enclosure 12 which are located above the second pan 38 out of view. Such elements include explosion-proof light housings and low-pressure warning lights, as is well understood by those skilled in the art.

As shown in FIG. 1, the walled enclosure 12 includes at least one worker access port for allowing a portion of a worker (not shown) to access the work area 16. In the present embodiment, the worker access port comprises a pair of glove ports 100 (partially shown) in the first panel 80 for allowing a worker located outside of the facility 10 to access the work area 16 through the glove ports in a manner well understood by those skilled in the art. Similarly, the first pan 18 includes a pulpit 102 having an aperture 104 therein for allowing a worker to stand partially within the work area 16. The pulpit 102 is preferably constructed of the same material as the first pan 18 and is preferably welded to the first pan 18 with the welds being ground and polished to a smooth generally arcuate finish to prevent solutions and materials from remaining in the work area 16.

Typically, the worker is encased in a half suit or upper-torso protection suit positioned within the work area 16 in sealed engagement with the aperture 102 for permitting the worker to access the work area 16 without being exposed to the materials (not shown). The upper-torso protective suit (not shown) is well understood by those skilled in the art and preferably includes an umbilical-fed air system with a dual inlet manifold (not shown) which provides charcoal-filtered air in conjunction with inflating the suit. The use of glove ports and half suits in connection with isolation systems are well understood by those skilled in the art and, therefore, further description thereof is omitted for purposes of convenience only and is not limiting.

As best shown in FIG. 1, the walled enclosure 12 includes a pass through box 106 (schematically and partially shown), preferably of the double-door type, for permitting material to be passed through to the worker 16. The pass through box 106 is of the conventional type and is well understood by those skilled in the art. An example of a pass through box for an isolation system is disclosed in U.S. Pat. No. 5,257,957.

In operation, the air flow control device 94 is actuated to cause a negative pressure within the facility 10. The hazardous material is then passed into the work area 16 through the pass through box 106, as is understood by those skilled in the art. The worker can then handle and manipulate the material until the process is completed. Once the process is completed and it is necessary to handle a different material and/or decontaminate the facility 10, any remaining material is passed back through the pass through box 106. A cleaning solution (not shown) is then introduced into the work area 16 (such as through a spray port (not shown) in the second pan 38) and applied to the interior surfaces 14a thereof. Since all of the corners of the walled enclosure 12 are formed of generally arcuate transition areas, the enclosure can be cleaned and decontaminated without fear of the cleaning solution or traces of hazardous materials remaining in the corners of the walled enclosure 12. Thus, the present invention comprises a facility 10 which is easily assembled and can be readily decontaminated and sterilized in a relatively short amount of time while assisting in preventing hazardous materials from remaining in the corners of the unit.

From the foregoing description, it can be seen that the present invention comprises a coved corner facility for providing a sealed work area to handle, manipulate and formulate materials. It will be appreciated by those skilled in the art that changes could be made to the embodiment described above without departing from the broad inventive concept thereof. It is understood, therefore, that this invention is not limited to the particular embodiment disclosed, but is intended to cover all modifications which are within the scope and spirit of the invention, as defined by the appended claims.

What is claimed is:

1. A coved corner facility for providing a sealed work area to handle, manipulate and formulate materials, said facility comprising:

a first pan including a first wall having a periphery and a first flange extending generally perpendicularly from said periphery of said first wall, a preformed generally arcuate transition area extending continuously between said periphery of said first wall and said first flange;

a second pan spaced from said first pan and including a second wall having a periphery, said second wall including a second flange extending generally perpendicularly from said periphery of said second wall and a preformed generally arcuate transition area extending continuously between said periphery of said second wall and said second flange;

a first strut extending between said first and second flanges, said first strut being generally arcuate in cross section;

a second strut extending between said first and second flanges, said second strut being generally arcuate in cross section;

a third strut extending between said first and second flanges, said third strut being generally arcuate in cross section;

a fourth strut extending between said first and second flanges, said fourth strut being generally arcuate in cross section;

a first panel extending between said first pan, second pan, first strut, and second strut;

a second panel extending between said first pan, second pan, second strut, and third strut;

a third panel extending between said first pan, second pan, third strut, and fourth strut;

a fourth panel extending between said first pan, second pan, fourth strut, and first strut, said first pan, second pan, first strut, second strut, third strut, fourth strut, first panel, second panel, third panel, and fourth panel forming a walled enclosure having an internal work area;

an inlet port in said walled enclosure for allowing air to flow into said work area;

an outlet port in said walled enclosure for allowing air to flow out of said work area; and an air flow control device for causing air to flow through said inlet port into said work area and out of said enclosure work area through said outlet port.

2. The coved corner facility as recited in claim 1 wherein said first pan, second pan, first strut, second strut, third strut, and fourth strut each include an interior surface and a joint is formed between each of said first, second, third, and fourth struts and said first and second flanges, said interior surfaces of said first pan, second pan, first strut, second strut, third strut, and fourth strut being generally coplanar proximate said joints.

3. The coved corner facility as recited in claim 2 wherein said joints are formed by butt welding said first, second, third, and fourth struts between said first and second flanges.

4. The coved corner facility as recited in claim 1 wherein said walled enclosure includes a worker access port for allowing a portion of a worker to access said work area.

5. The coved corner facility as recited in claim 1 wherein the preformed generally arcuate transition areas extend smoothly and without exposed joints between the planar portions of each adjoining pair of walls.

6. The coved corner facility as recited in claim 1 wherein said first pan is a one-piece, single element and wherein said first flange fully surrounds said first wall along said first wall periphery.

7. The coved corner facility as recited in claim 6 wherein the said second pan is a one-piece, single element and wherein said second flange fully surrounds said second wall along said second wall periphery.

8. The coved corner facility as recited in claim 1 further comprising a plurality of wheels coupled with the first pan and positioned below the first pan so as to support the first pan for movement across a floor.

9. A coved corner facility for providing a sealed work area to handle, manipulate and formulate materials, said facility comprising:

a first pan including a first wall having a periphery defining first, second, third and fourth corners, said first pan including a first flange portion extending generally perpendicularly from said periphery between said first and second corners, a second flange portion extending generally perpendicularly from said periphery between said second and third corners, a third flange portion extending generally perpendicularly from said periphery between said third and fourth corners, and a fourth flange portion extending generally perpendicularly from said periphery between said fourth and first corners, said first pan including preformed generally arcuate transition areas extending continuously between said periphery and said first, second, third and fourth flange portions, said first and second flange portions, said second and third flange portions, said third and fourth flange portions, and said fourth and first flange portions;

a second pan spaced from said first pan and including a second wall having a periphery defining fifth, sixth, seventh and eighth corners, said second pan including a fifth flange portion extending generally perpendicularly from said periphery of said second wall between said fifth and sixth corners, a sixth flange portion extending generally perpendicularly from said periphery of said second wall between said sixth and seventh corners, a seventh flange portion extending generally perpendicularly from said periphery of said second wall between said seventh and eighth corners, and an eighth flange portion extending generally perpendicularly from said periphery of said second wall between said eighth and fifth corners, said second pan including preformed generally arcuate transition areas extending continuously between said periphery of said second wall and said fifth, sixth, seventh, and eighth flange portions, said fifth and sixth flange portions, said sixth and seventh flange portions, said seventh and eighth flange portions, and said eighth and fifth flange portions;

a first strut extending between said transition area between said first and fourth flange portions and said transition area between said fifth and eighth flange portions, said first strut being generally arcuate in cross section with a curvature duplicating curvatures of the preformed arcuate transition areas between said first and fourth flange portions and between said fifth and eighth flange portions such that said first strut arcuately complements said transition area between said first and fourth flange portions and said transition area between said fifth and eighth flange portions;

a second strut extending between said transition area between said first and second flange portions and said transition area between said fifth and sixth flange portions, said second strut being generally arcuate in cross section with a curvature duplicating curvatures of the preformed arcuate transition areas between said first and second flange portions and between said fifth and sixth flange portions such that said second strut arcuately complements said transition area between said first and second flange portions and said transition area between said fifth and sixth flange portions;

a third strut extending between said transition area between said second and third flange portions and said transition area between said sixth and seventh flange portions, said third strut being generally arcuate in cross section with a curvature duplicating curvatures of the preformed arcuate transition areas between said second and third flange portions and between said sixth and seventh flange portions such that said third strut arcuately complements said transition area between said second and third flange portions and said transition area between said sixth and seventh flange portions;

a fourth strut extending between said transition area between said third and fourth flange portions and said transition area between said seventh and eighth flange portions, said fourth strut being generally arcuate in cross section with a curvature duplicating curvatures of the preformed arcuate transition areas between said third and fourth flange portions and between said seventh and eighth flange portions such that said fourth strut arcuately complements said transition area between said third and fourth flange portions and said transition area between said seventh and eighth flange portions;

a first panel extending between said first pan, second pan, first strut, and second strut;

a second panel extending between said first pan, second pan, second strut, and third strut;

a third panel extending between said first pan, second pan, third strut, and fourth strut;

a fourth panel extending between said first pan, second pan, fourth strut, and first strut, said first pan, second pan, first strut, second strut, third strut, fourth strut, first panel, second panel, third panel, and fourth panel forming a walled enclosure having an internal work area;

an inlet port in said walled enclosure for allowing air to flow into said work area;

an outlet port in said walled enclosure for allowing air to flow out of said work area; and an air flow control device for causing air to flow through said inlet port into said work area and out of said enclosure work area through said outlet port.

10. The coved corner facility as recited in claim 9 wherein said walled enclosure includes a worker access port for allowing a portion of a worker to access said work area.

11. The coved corner facility as recited in claim 9 wherein the said first pan is a one-piece, single element and wherein said first, second, third and fourth flange portions collectively fully surround said first wall along said first wall periphery.

12. The coved corner facility as recited in claim 11 wherein the said second pan is a one-piece, single element and wherein said fifth, sixth, seventh and eighth flange portions collectively fully surround said second wall along said second wall periphery.

13. The coved corner facility of claim 9 further comprising a plurality of wheels coupled with the first pan and positioned below the first pan so as to support the first pan for movement across a floor.

14. A method of assembling a coved corner facility for providing a sealed work area to handle, manipulate and formulate materials, said method comprising the steps of:

forming a first pan including a first wall having a periphery, a flange extending generally perpendicularly from said periphery of said first wall, and a preformed generally arcuate transition area extending continuously between said periphery of said second wall and said flange;

forming a second pan spaced from said first pan and including a second wall having a periphery, a second flange extending generally perpendicularly from said periphery of said second wall and a preformed generally arcuate transition area extending continuously between said periphery of said second wall and said second flange;

forming a first strut which is generally arcuate in cross section;

butt welding said first strut between said first and second flanges;

forming a second strut which is generally arcuate in cross section;

butt welding a second strut between said first and second flanges;

forming a third strut which is generally arcuate in cross section;

butt welding said third strut between said first and second flanges;

forming a fourth strut which is generally arcuate in cross section;

butt welding a fourth strut between said first and second flanges;

installing a first panel between said first pan, second pan, first strut, and second strut;

installing a second panel between said first pan, second pan, second strut, and third strut;

installing a third panel between said first pan, second pan, third strut, and fourth strut;

installing a fourth panel between said first pan, second pan, fourth strut, and first strut wherein said first pan, second pan, first strut, second strut, third strut, fourth strut, first panel, second panel, third panel, and fourth panel forming a walled enclosure having an internal work area;

installing an inlet port in said walled enclosure for allowing air to flow into said work area;

installing an outlet port in said walled enclosure for allowing air to flow out of said work area; and installing an air flow control device for causing air to flow through said inlet port onto said work area and out of said enclosure work area through said outlet port.

15. The method of claim 14 wherein said step of forming said first pan further comprises forming said first wall and said first flange in one piece from the same one piece of material.

16. The method of claim 15 wherein said step of forming said second pan further comprises forming said second wall and said second flange in one piece from the same one piece of material.

* * * * *